March 7, 1950     A. A. BROWNE     2,499,456
BEARING SLEEVE FOR PUMP SHAFTS
Filed July 13, 1944
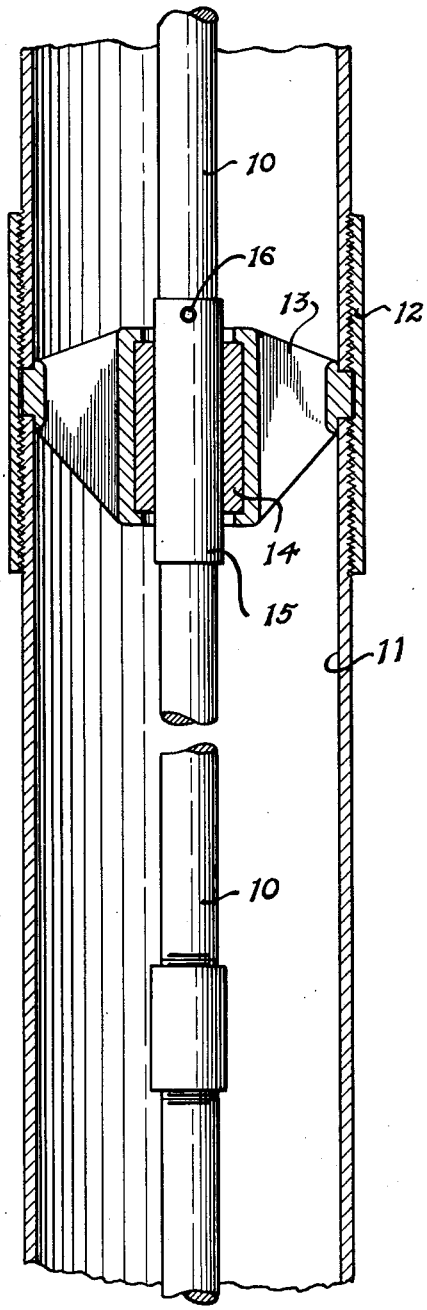
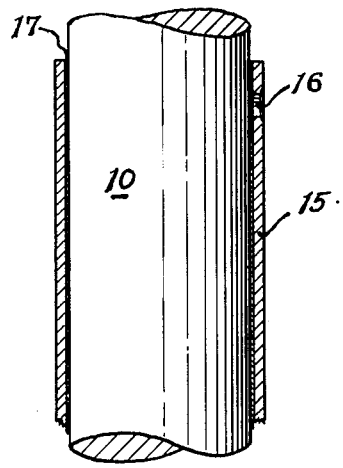
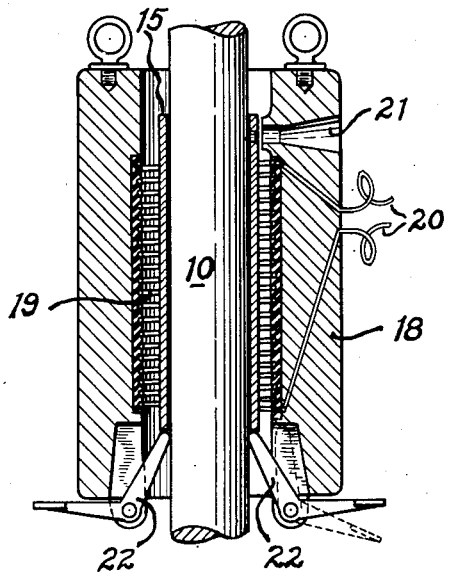
INVENTOR.
ALBERT A. BROWNE.
BY
*Wm. H. Atkinson*
ATTORNEY.

Patented Mar. 7, 1950

2,499,456

UNITED STATES PATENT OFFICE 2,499,456

BEARING SLEEVE FOR PUMP SHAFTS

Albert A. Browne, Palo Alto, Calif., assignor, by mesne assignments, to Fairbanks, Morse & Co., a corporation of Illinois Application July 13, 1944, Serial No. 544,770

5 Claims. (Cl. 308—237)

The present invention relates to shaft bearings, and more particularly to a bearing for supporting the line shaft of a centrifugal or impeller type of pump in which the bearing is submerged in the flow of the liquid being pumped.

It may be said that the principal object of the invention is to provide a new and novel type of self-lubricating bearing surface for a pump shaft which can be easily applied to a shaft in a simple and expeditious manner.

Another object of the invention is to provide an improved shaft and sleeve assembly of the type contemplated by which a hardened, non-corrosive sleeve may be firmly secured upon a shaft in a new and novel manner, and which will at the same time permit of an easy removal and replacement of the sleeve without damage to the shaft in the event of excessive wear.

A further object of the invention is to provide a new and novel method for applying a non-corrosive and wear-resistant surface of the type described to the bearing engaging portion of an exposed pump shaft.

Other objects and advantages of the invention will be in part evident to those skilled in the art, and in part pointed out hereinafter in the following description taken in connection with the accompanying drawing, wherein there is shown by way of illustration and not of limitation a preferred embodiment of the invention.

In the drawing:

Figure 1 is a vertical sectional view of a portion of a pump discharge pipe showing a shaft provided with the invention journaled therein, Figure 2 is a fragmentary enlarged view, in section, showing the details of a sleeve assembly constructed in accordance with the invention, and Figure 3 is a vertical view in section showing a preferred form of tool or device with which the application of the sleeve to a shaft can be conveniently carried out in accordance with the invention.

In bearings of the type contemplated by my invention, and particularly those where water is being pumped, it is the practice, in order to avoid contamination of the water by lubricating oils, to provide a rubber or other non-metallic bearing in which the shaft is journaled, and in this manner a bearing is provided that can be water lubricated. While these rubber and other non-metallic bearings are less susceptible to wear from the abrasive action of sand particles and the like entrained in the water, it has been found that the bearing engaging portion of the shaft soon becomes worn or scored by the action of these foreign particles and, therefore, to meet this difficulty, it has also been proposed to provide the shaft with a hardened wearing surface at the point where the shaft is journaled within the bearing. One such attempt at a solution to this problem is illustrated by Hait Patent No. 2,208,975, entitled "Open line shaft bearing," which discloses the use of a chromium surface electrolytically deposited upon a pump shaft. And while this arrangement provides a wear resisting surface upon the shaft, which greatly prolongs the life of the bearing, it is open to the objection that the application of such a surface to the shaft entails an expensive and complicated operation and, further, when the chromium layer becomes worn or scored, it cannot be renewed without completely disassembling the pump and replating the shaft.

Another procedure which has been followed quite extensively is to provide the line shaft with a non-corrosive sleeve of Monel metal or stainless steel which is shrunk and swaged into an annular groove formed around the shaft for the length of the sleeve, and while this arrangement has been found satisfactory, it, too, is open to some objections, the principal ones of which are that because of the shrinking and swaging operations to which the sleeve is subjected, it cannot be hardened beforehand, nor can the sleeve be easily replaced when it becomes worn, and in no event can this repair be made on a pump in the field, which is an important consideration as, under some conditions of use, these sleeves are required to be replaced quite frequently.

Among other methods of providing a hardened wearing surface upon the line shaft of the type under consideration may be mentioned the simple arrangement of a sleeve that is applied to the shaft with a shrink fit. In this arrangement the heating involved in the making of such a shrink fit tends to anneal or destroy the hardness of the sleeve, and this operation is also difficult to perform in the field in the event that a repair is required. It has also been proposed to provide the shaft with a slip-fitting sleeve that is secured against displacement by means of machine screws or studs. Due to the nature of the fit thus provided, there is a tendency for rust to form between the shaft and sleeve which, in the event of a renewal of the sleeve, will require a refinishing of the shaft surface and, consequently, the use of an undersized sleeve. Spot welding has also been resorted to as a means for fastening such a sleeve on a shaft, but with this method uneven stresses are set up in the shaft and sleeve and replacements in the field are practically impossible.

In addition to the problem of providing a wear resisting surface upon the shaft, there is also the requirement that the bearing surface be of a non-rusting or non-corrosive character, and this requires that the sleeve should be formed of a non-corrosive metal. Further, where the bearing supporting member is formed of brass or bronze and the shaft or sleeve thereupon is chromium, it has also been found that an electrolytic and mechanical action is set up which has a tendency to cause the chromium plating to flow and expose the soft metal thereunder which, in accordance with best practices, is a nickel plating that is applied to the shaft prior to the chromium plating operation. By my invention I have overcome the above objections and, at the same time, I have provided a wearing surface upon a shaft that will have all of the advantages of the best prior art practices and which will possess other advantages not found in the prior art arrangements. As for example, a greater hardness, a more simple assembly, and a more convenient renewability.

For a more detailed description of my invention, reference is now made to Figure 1 of the drawing, wherein I have shown a vertical shaft 10, such as is generally used to establish a driving connection between a driving motor and a pump (not shown) which is positioned at the lower end of a well column 11. The well column 11 is composed of a series of lengths of pipe that are secured in end-to-end relation by an internally threaded coupling 12, and positioned between the ends of these lengths of pipe, there is a spider-like bearing support 13 that carries a non-metallic bearing surface forming member 14 which may be of rubber, wood, a suitable plastic, or in fact any other type of water lubricated bearing material. Carried by the shaft 10 and disposed within and extending through the bearing surface forming member 14 there is a hardened bearing engaging sleeve 15 which is firmly secured upon the shaft. This hardened bearing engaging sleeve 15 is of a non-corrosive metal and, in accordance with the preferred embodiment of my invention, it will consist of a chemically or nitride hardened sleeve of stainless steel. Because of its physical and chemical characteristics, it will at once be seen that such a sleeve cannot be expanded by the application of heat so as to establish a conventional shrink fit upon the shaft 10. Therefore, I have found it necessary to provide a novel means for securing such a sleeve 15 upon the shaft. This I have accomplished, as will be seen from the drawing, by providing the hardened bearing engaging sleeve 15 with a small hole 16 through which a relatively soft solder or other low melting point metal may be introduced into the space between the shaft 10 and the sleeve 15 while the sleeve 15 is subjected to heating at a temperature sufficient to slightly expand it and, at the same time, flow the softer metal, but below the temperature at which the hardness of the sleeve 15 will be detrimentally affected.

In Figure 2 of the drawing the small hole 16 is shown as positioned a short distance down from the upper end of the sleeve 15 so that when the assembly, with the sleeve 15 in place upon the shaft 10, is heated to the required temperature, a solder or other low melting point metal 17 may be introduced between the shaft 10 and the sleeve 15. Under these conditions the low melting point metal or solder 17 will flow by capillary action throughout the entire area of the shaft which is encompassed by the sleeve 15 and, in this way, the softer metal will be placed under a shrink or compressive stress when the sleeve 15 is permitted to cool and the result will be a combined adhesion and shrink fit attachment of the sleeve 15 to the shaft 10.

While it is conceivable that a heating of the hardened bearing engaging sleeve 15 may be accomplished in a number of ways, I have shown in Figure 3 of the drawing a simple device by which the sleeve 15 may be attached to the shaft 10 in a simple and convenient manner. This device comprises a supporting body member 18 that has a central opening in which the shaft 10, with the sleeve 15, may be positioned. In its preferred form the device 18 will carry an electrical heating unit which may be of the heat radiating or inductive type. In the present instance it is shown with a resistance-type of heat radiating unit 19 which is adapted to be connected to a power line through conductors 20. At the upper end of the device 18 and adapted to register with the hole 16 in the sleeve 15, there is an opening or feed hole 21 through which solder or a strip of other low melting point metal may be introduced to the hole 16 in the sleeve 15 while the latter is in an expanded condition. When this device is equipped with an inductive type of heating unit, it will be understood that the resistance winding 19 will be replaced by an insulated winding that will act as the primary of a transformer which, when energized, will induce a secondary current into the hardened bearing engaging sleeve 15. This will cause the sleeve 15 to expand slightly and, at the same time, provide the heat necessary to effect a complete capillary flow of the low melting point metal 17 between the shaft 10 and the sleeve 15. As an additional feature the device may be provided with two pivotally mounted levers or dogs 22 that will engage the lower end of the sleeve 15 so that it may be raised and/or lowered along the shaft 10 while the sleeve 15 is expanded and then held in any desired position while the low melting point metal 17 is being flowed under the sleeve 15. Following this operation it will be seen that when the heating unit 19 is disconnected from its circuit, the low melting point metal 17 and the sleeve 15 will immediately cool and the result will be a combined shrink fit and soldered connection between the shaft 10 and the sleeve 15.

Among some of the advantages obtained by the use of my invention may be mentioned the possibility of providing a hardened and non-corrosive bearing surface which will have a hardness substantially equal to that of chromium, and one which will have a greater wearing life, due to the fact that the stainless steel sleeve will be less subject to electrolytic action than is the case with chromium, which has a high electrolytic potential value. Another advantage is that the sleeve may be conveniently replaced in the field without subjecting the shaft or the bearing engaging sleeve to an excessive heating which might destroy the hardness of the sleeve or cause the shaft to warp. And finally, it provides an arrangement wherein the hardened sleeve will be homogeneously secured to the shaft and in a truly concentric relation so that no further machining or polishing will be required. This latter advantage is attributable to the fact that when the sleeve is secured to the shaft in the manner proposed, the small capillary clearance provided between the shaft 10 and the heat expanded sleeve 15 will cause a uniform distribution of the low melting point metal 17 at a temperature below that at which the hardness of the sleeve will be affected. With this arrangement it will also be noted that with the sleeve 15 mounted as here shown, a shoulder will be formed at each end thereof which will serve to deflect any sand or other foreign particles which might otherwise creep or flow along the shaft 10 and enter the bearing member 14.

While I have, for the sake of clearness and in order to disclose the invention so that the same can be readily understood, described and illustrated a specific device and arrangement, I desire to have it understood that the invention is not limited to the specific form disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. In a submerged line shaft bearing, the combination of a steel line shaft, a hardened non-corrosive metal sleeve adapted for a shrink fit upon said shaft and providing a hardened bearing surface at a point along said shaft, and a compressed capillary layer of a low melting point flowable metal between said sleeve and said shaft.

2. In a submerged line shaft bearing, the combination of a steel line shaft, a chemically hardened stainless steel sleeve adapted for a shrink fit upon said shaft and providing a bearing surface at a point along said shaft, and a layer of low melting point flowable metal under compression between said sleeve and said shaft.

3. In a submerged line shaft bearing, the combination of a non-metallic water lubricated bearing member, an exposed steel shaft extending through said bearing, a chemically surface hardened stainless steel sleeve secured upon said shaft and positioned within said bearing member, and a capillary layer of low melting point metal held under compression by a shrinking of said stainless steel shell thereover.

4. In a submerged line shaft bearing, the combination of a bearing member having a non-metallic surface forming bushing, a steel shaft extending through said bearing member, a hardened stainless steel sleeve disposed within said non-metallic bushing, and a soft metal bond under compression securing said stainless steel sleeve upon said shaft.

5. In an open line shaft, the combination of a steel shaft, a nitride hardened stainless steel sleeve fitted over said shaft, and a bond between said shaft and said sleeve comprising a capillary layer of low melting point metal over which said stainless steel sleeve is positioned with a shrink fit.

ALBERT A. BROWNE.

REFERENCES CITED

The following references are of record in the file of this patent:

UNITED STATES PATENTS

| Number | Name | Date |
| --- | --- | --- |
| 579,969 | Fellows | Apr. 6, 1897 |
| 1,535,336 | Nixon | Apr. 28, 1925 |
| 1,557,767 | Oliver | Oct. 20, 1925 |
| 1,888,588 | Edwards | Nov. 22, 1932 |
| 1,935,425 | Wiggins | Nov. 14, 1933 |
| 1,947,969 | Browne | Feb. 20, 1934 |
| 1,975,422 | Hellenproich | Oct. 2, 1934 |
| 2,053,808 | Young | Sept. 8, 1936 |
| 2,060,034 | Chandler | Nov. 10, 1936 |
| 2,208,975 | Hait | July 23, 1940 |
| 2,224,145 | Dugan | Dec. 10, 1940 |